United States Patent
Shin

(10) Patent No.: US 6,845,960 B2
(45) Date of Patent: Jan. 25, 2005

(54) HYDRAULIC AND PNEUMATIC OPERATIVE DIAPHRAGM VALVE

(75) Inventor: Young-Hoon Shin, Seoul (KR)

(73) Assignee: Jae-Hyun Shin, Seoul (KR)

( * ) Notice: Subject to any disclaimer, the term of this patent is extended or adjusted under 35 U.S.C. 154(b) by 0 days.

(21) Appl. No.: 10/466,999

(22) PCT Filed: Jan. 19, 2002

(86) PCT No.: PCT/KR02/00097
§ 371 (c)(1),
(2), (4) Date: Jul. 21, 2003

(87) PCT Pub. No.: WO02/057669
PCT Pub. Date: Jul. 25, 2002

(65) Prior Publication Data
US 2004/0094735 A1 May 20, 2004

(30) Foreign Application Priority Data

| Jan. 19, 2001 | (KR) | 2001-0001639 |
| Jan. 19, 2001 | (KR) | 2001-0001640 |
| Jan. 19, 2001 | (KR) | 2001-0001641 |
| Jan. 19, 2001 | (KR) | 2001-0001643 |
| Jan. 19, 2001 | (KR) | 2001-0001638 |

(51) Int. Cl.⁷ ............................................. F16K 31/12
(52) U.S. Cl. ...................... 251/14; 251/28; 251/41; 251/46; 251/295
(58) Field of Search .................. 251/14, 295, 41, 251/28, 46

(56) References Cited

U.S. PATENT DOCUMENTS

| 1,241,037 A | * | 9/1917 | Sharp | 251/41 |
| 1,587,516 A | * | 6/1926 | Forfar | 251/41 |
| 2,053,640 A | * | 9/1936 | Sloan | 251/295 |
| 3,536,294 A | * | 10/1970 | Rodriguez | 251/41 |
| 4,052,035 A | | 10/1977 | Kenny et al. | |
| 4,630,644 A | * | 12/1986 | Hafner et al. | 251/295 |
| 4,809,733 A | * | 3/1989 | Hawkins | 251/14 |
| 5,029,806 A | * | 7/1991 | Huo-Lien et al. | 251/14 |

FOREIGN PATENT DOCUMENTS

| JP | 9-316942 | * | 10/1997 |
| KR | 97-73495 | * | 12/1997 |
| KR | 10-0254905 | | 12/1997 |

* cited by examiner

Primary Examiner—John Bastianelli
(74) Attorney, Agent, or Firm—Jordan and Hamburg LLP

(57) ABSTRACT

Disclosed is a diaphragm valve. When a chamber is expanded by fluid supply into a pipe-shaped button, a valve stem is slightly moved upward by a rod and a shaft to open an outlet of an orifice. Fluid received in a space between a cap and a diaphragm and having a high pressure is discharged into an outlet-side space, whereby the diaphragm opens a guide conduit. When fluid is discharged from the pipe-shaped button, the diaphragm is moved toward the guide conduit, and the valve stem closes the outlet. The fluid in the inlet-side space has a high pressure, and the fluid in the space between the cap and diaphragm has a low pressure. The high pressure fluid flows toward the low pressure fluid through a pilot hole of the diaphragm. When fluid pressure balance is effected between the spaces, the diaphragm closes the guide conduit.

7 Claims, 17 Drawing Sheets

HYDRAULIC AND PNEUMATIC OPERATIVE DIAPHRAGM VALVE

TECHNICAL FIELD

The present invention relates to a diaphragm valve for controlling fluid flow using a diaphragm, and more particularly, the present invention relates to a hydraulically and pneumatically operated diaphragm valve which is constructed to allow a diaphragm to open a flow path when a chamber of a bladder member communicated with a button is expanded and to close the flow path when the chamber of the bladder member is returned to its original state, thereby hydraulically and pneumatically controlling fluid flow even under a situation where electricity is not supplied and thus a solenoid valve cannot be used. In the hydraulically and pneumatically operated diaphragm valve, the button, which operates the diaphragm, is sealed while accommodating therein working fluid, so that, when the button is pressed, the chamber of the bladder member communicated with the button is expanded, and, when the button is released, the chamber of the bladder member returns to its original state, whereby, as the diaphragm opens and closes the flow path, it is possible to manually control fluid flow in a convenient manner.

BACKGROUND ART

In a conventional fluid control valve, a flow path is opened and closed by rotating a stick-shaped lever leftward and rightward. This type of fluid control valve suffers from defects in that, since the lever must be rotated every time the flow path is opened and closed, inconvenience is caused upon use. Also, because fluid is unintentionally discharged through the opened flow path until the lever is completely rotated to a closing position, waste of fluid is increased.

Another conventional fluid control valve is disclosed in the art, in which a lever provided at an upper end of a valve body is manipulated upward and downward to open and close the valve and rotated leftward and rightward to adjust a temperature of water. However, this fluid control valve also suffers from defects in that, since the lever is provided at the upper end of the valve body and thereby must be manipulated every time the flow path is opened and closed, inconvenience is caused upon use and waste of fluid is increased.

DISCLOSURE OF THE INVENTION

Accordingly, an object of the present invention is to solve the problems occurring in the related art.

According to one aspect of the present invention, there is provided a hydraulically and pneumatically operated diaphragm valve comprising: a valve housing defined at both side walls thereof with a fluid inlet and a fluid outlet, the valve housing possessing an upper end opening and a lower end opening which are communicated with the inside of the valve housing, the valve housing having formed therein an upright wall which divides a space in the valve housing into an inlet-side space and an outlet-side space, the valve housing being projectedly formed at a center portion thereof with a guide conduit through which fluid introduced into the valve housing through the fluid inlet can flow to be discharged through the fluid outlet; a cap detachably assembled to an upper wall of the valve housing to close the upper end opening of the valve housing; a holder detachably assembled to a lower wall of the valve housing in opposition to the cap to be communicated with the lower end opening of the valve housing, and formed, on an inner surface thereof and adjacent to a lower end thereof, with an inward flange; a button having a configuration of a pipe member in a manner such that a bladder member, which is fixedly received in the holder by being squeezed against the inward flange of the holder, is connected to one end of the pipe member, and the other end of the pipe member projects out of the holder to be externally supplied with working fluid and thereby allow the bladder member to be expanded; fluid controlling means arranged between the guide conduit and the cap, the fluid controlling means being configured in a manner such that, when a valve stem is moved upward by expansion of the bladder member and an orifice defined through a valve seat is opened, fluid accommodated in a valve chamber defined between the cap and a diaphragm is discharged through the orifice into the outlet-side space, that, as the valve chamber has a low pressure, the diaphragm opens the guide conduit under action of a high pressure in the inlet-side space and fluid in the inlet-side space flows through the guide conduit into the outlet-side space, that, when the bladder member returns to its original state by evacuation of the working fluid from the bladder member, the diaphragm and the valve stem are returned to their original positions by first and second elastic members respectively interposed between the cap and a support plate and between the cap and the valve stem, and that, as high pressure fluid accommodated in the inlet-side space flows through a pilot hole defined in the diaphragm into the valve chamber, when fluid pressure balance is effected between the inlet-side space and the valve chamber, the diaphragm closes the guide conduit and interrupts fluid flow from the inlet-side space into the outlet-side space; and power transmission means configured in a manner such that it is moved upward by expansion of the bladder member of the button and transmits expansion force of the bladder member to the valve stem so as to allow the valve stem to open the orifice of the valve seat, and it returns to its original position when the bladder member returns to its original state.

By this feature of the present invention, since the button can be hydraulically and pneumatically manipulated in a remote manner, the diaphragm valve according to the present invention can be used in lieu of a solenoid valve. In particular, at a place where electricity is not supplied, fluid flow can be controlled by manually pressing the button.

The diaphragm valve according to the present invention can be constructed in a manner such that it is installed in a kitchen or bathroom and conveniently manipulated to prevent waste of water.

According to another aspect of the present invention, there is provided a hydraulically and pneumatically operated diaphragm valve comprising: a valve housing defined at one side wall thereof with a fluid inlet and at a lower wall thereof with a fluid outlet, the valve housing possessing an upper end opening which is defined in opposition to the fluid outlet and communicated with the inside of the valve housing, the valve housing having formed therein an upright wall which divides a space in the valve housing into an inlet-side space and an outlet-side space, the valve housing being projectedly formed at a center portion thereof with a guide conduit through which fluid introduced into the valve housing through the fluid inlet can flow to be discharged through the fluid outlet; a cap detachably assembled to an upper wall of the valve housing to close the upper end opening of the valve housing; a flow connector installed in the outlet-side opening of the valve housing concentrically with the guide conduit, the flow connector being defined, on an upper wall thereof, with a center hole and, on a side wall thereof and adjacent to an opened lower end thereof, with at least one fluid passage through which fluid passing through the guide conduit can flow toward the fluid outlet; a button having a pipe member and first and second bladder members which are connected to both ends of the pipe member, the button being filled with working fluid, the first bladder member projecting to the outside through an assembling hole defined in the other side wall of the valve housing and the second bladder member being fixed in the center hole of the flow connector, in a manner such that, when the fist bladder member is pressed and released, the second bladder member is expanded and returns to its original state, respectively; fluid controlling means arranged between the guide conduit and the cap, the fluid controlling means being configured in a manner such that, when a valve stem is moved upward by pressing of the first bladder member and expansion of the second bladder member and an orifice defined through a valve seat is opened, high pressure fluid accommodated in a valve chamber defined between the cap and a diaphragm is discharged through the orifice into the outlet-side space having a low pressure, that, as the valve chamber has a low pressure, the diaphragm opens the guide conduit under action of a high pressure in the inlet-side space and fluid in the inlet-side space flows through the guide conduit into the outlet-side space, that, when the first bladder member is released and the second bladder member returns to its original state, the diaphragm and the valve stem are returned to their original positions by first and second elastic members respectively interposed between the cap and a support plate and between the cap and the valve stem, and that, as high pressure fluid accommodated in the inlet-side space flows through a pilot hole defined in the diaphragm into the valve chamber, when fluid pressure balance is effected between the inlet-side space and the valve chamber, the diaphragm closes the guide conduit and interrupts fluid flow from the inlet-side space into the outlet-side space; and a power transmission shaft disposed in the guide conduit and having an upper end which is joined to a lower end of the valve stem and a lower end which is brought into contact with the second bladder member, the power transmission shaft being configured in a manner such that it is moved upward by expansion of the second bladder member of the button and transmits expansion force of the second bladder member to the valve stem so as to allow the valve stem to open the orifice of the valve seat.

By this feature of the present invention, in the case that the present diaphragm valve is installed on a urinal, since it is possible to wash the urinal using water discharged by softly pressing the projected button, even children or old and feeble persons can conveniently manipulate the diaphragm valve.

BRIEF DESCRIPTION OF THE DRAWINGS

The above objects, and other features and advantages of the present invention will become more apparent after a reading of the following detailed description when taken in conjunction with the drawings, in which.

BEST MODE FOR CARRYING OUT THE INVENTION

Figure 1:
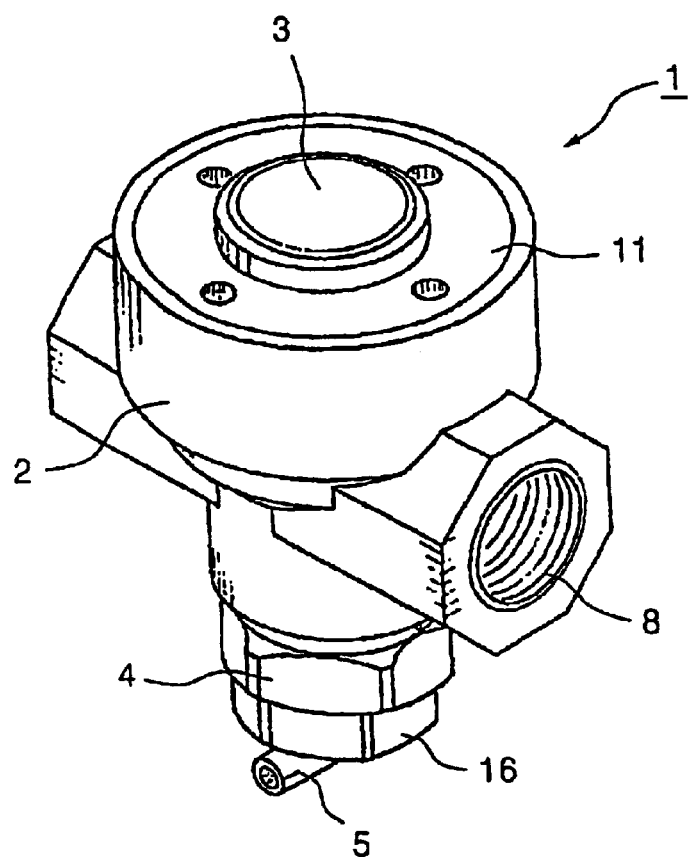
FIG. 1 is a perspective view illustrating a hydraulically and pneumatically operated diaphragm valve in accordance with a first embodiment of the present invention.
Figure 2:
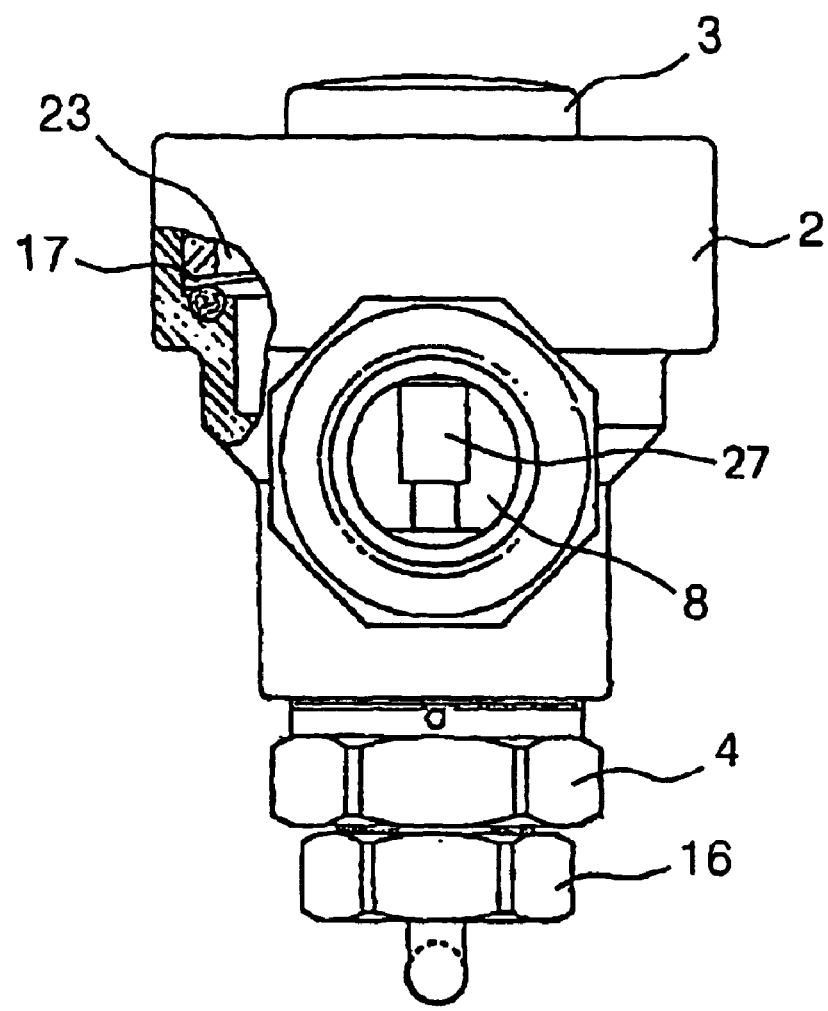
FIG. 2 is a partially broken-away front view illustrating the diaphragm valve of FIG. 1.

Reference will now be made in greater detail to a preferred embodiment of the invention, an example of which is illustrated in the accompanying drawings. Wherever possible, the same reference numerals will be used throughout the drawings and the description to refer to the same or like parts.

Referring to FIGS. 1 through 4, there is shown a hydraulically and pneumatically operated diaphragm valve in accordance with a first embodiment of the present invention. The hydraulically and pneumatically operated diaphragm valve designated by reference numeral 1 comprises a valve housing 2, a cap 3, a holder 4, a button 5, fluid controlling means 6, and power transmission means. The valve housing 2 is defined therein with a fluid path. The cap 3 closes an upper end opening of the valve housing 2. The holder 4 is fitted into a lower end opening of the valve housing 2. The button 5 has a configuration of a pipe member in a manner such that a bladder member 14, which is fixedly received in the holder 4, is connected to one end of the pipe member, and the other end of the pipe member is drawn out of the holder 4. When working fluid is externally supplied through the other end of the pipe member, the bladder member 14 is expanded, and, when working fluid is discharged through the other end of the pipe member, the bladder member 14 returns to its original state, so that the fluid path of the valve housing 2 is opened and closed, respectively. The fluid controlling means 6 has a diaphragm 17. The diaphragm 17 functions to open the fluid path when the bladder member 14 of the button 5 is expanded and close the fluid path when the bladder member 14 of the button 5 returns to its original state. The power transmission means is positioned between the button 5 and the fluid controlling means 6. When the bladder member 14 of the button 5 is expanded, the power transmission means is moved upward and transmits power to allow the diaphragm 17 to open the fluid path.

The valve housing 2 is defined at both side walls thereof with a fluid inlet 7 and a fluid outlet 8. The valve housing 2 possesses the upper end opening and the lower end opening which are communicated with the inside of the valve housing 2. The valve housing 2 has formed therein an upright wall 9 which divides a space in the valve housing 2 into an inlet-side space A and an outlet-side space B. The valve housing 2 is projectedly formed at a center portion thereof with a guide conduit 10 through which fluid introduced into the valve housing 2 through the fluid inlet 7 can flow to be discharged through the fluid outlet 8.

Both side walls of the valve housing 2 which define the fluid inlet 7 and outlet 8 are formed with internal threads.

The guide conduit 10 projects at the widthwise center portion of the valve housing 2 toward the cap 3 which closes the upper end opening of the valve housing 2. The guide conduit 10 is opened and closed by the fluid controlling means 6 which is installed in the upper end opening of the valve housing 2.

The cap 3 is detachably assembled to an upper wall of the valve housing 2. After the fluid controlling means 6 is installed in the upper end opening of the valve housing 2, the cap 3 closes the upper end opening. While it is illustrated in the drawings that the cap 3 is locked to the valve housing 2 by means of a lock nut 11, it is to be readily understood that the cap 3 can be locked to the valve housing 2 in a diversity of different ways.

The cap 3 has a receptacle-shaped contour. A receiving groove 12 for receiving an upper end of a valve stem 20 constituting the fluid controlling means 6 is defined at a center portion of the cap 3.

The holder 4 serves to receive the button 5. The holder 4 is detachably assembled to a lower wall of the valve housing 2 in opposition to the cap 3 to be communicated with the lower end opening of the valve housing 2. The holder 4 is formed, on an inner surface thereof and adjacent to a lower end thereof, with an inward flange 13 against which the bladder member 14 of the button 5 is squeezed.

As described above, the button 5 has the configuration of the pipe member in a manner such that the bladder member 14, which is fixedly received in the holder 4 by being squeezed against the inward flange 13 of the holder 4, is connected to one end of the pipe member, and the other end of the pipe member is drawn out of the holder 4. Here, an outward flange 15 is formed on a circumferential outer surface of the pipe member of the button 5. Due to the fact that a tightening nut 16 is threadedly coupled to the holder 4, the outward flange 15 squeezes a free end portion of the bladder member 14 against the inward flange 13 of the holder 4. It is preferred that the bladder member 14 is made of a soft material such as rubber.

In the button 5 structured as described above, as working fluid is externally supplied through the pipe member which is drawn out of the holder 4, the bladder member 14 is expanded to move upward the power transmission means. By the upward movement of the power transmission means, the valve stem 20 opens an orifice 19 defined in a valve seat 18 to allow fluid flow through the orifice 19.

In this preferred embodiment of the present invention, the pipe member of the button 5 which is drawn out of the holder 4 is connected with a working fluid supplier S. Therefore, the bladder member 14 is expanded by working fluid (air or liquid) supplied from the working fluid supplier S to control fluid flow from the fluid inlet 7 toward the fluid outlet 8. The working fluid supplier S may be automatically or manually actuated.

While working fluid supplied into the button 5 may comprise air, it is preferred that the working fluid comprises liquid having a low compressibility in view of operational precision.

The fluid controlling means 6 includes the diaphragm 17, the valve seat 18, the valve stem 20, a support plate 21, and first and second elastic members 22 and 23. The diaphragm 17 is made of an elastic material and functions to open and close the guide conduit 10. The valve seat 18 is installed through the diaphragm 17 and is defined with the orifice 19. The valve stem 20 is slidably fitted through the valve seat 18 to open and close the orifice 19. The support plate 21 is attached to an upper surface of the diaphragm 17 to support the diaphragm 17. The first and second elastic members 22 and 23 are interposed between the cap 3 and the support plate 21 and between the cap 3 and the valve stem 20 to apply returning force to the diaphragm 17 and the valve stem 20 upon closing the guide conduit 10, respectively.

The fluid controlling means 6 is well known in the art and has been widely used in a fluid controlling field. In this preferred embodiment of the present invention, the fluid controlling means 6 is arranged between the cap 3 and the guide conduit 10.

The fluid controlling means 6 is configured in a manner such that, when the valve stem 20 is moved upward by expansion of the bladder member 14 and the orifice 19 of the valve seat 18 is opened, fluid accommodated in a valve chamber C defined between the cap 3 and the diaphragm 17 is discharged through the orifice 19 into the outlet-side space B having a low pressure. Then, as the valve chamber C has a low pressure, the diaphragm 17 opens the guide conduit 10 under action of a high pressure of fluid accommodated in the inlet-side space A. If the bladder member 14 returns to its original state by evacuation of the working fluid from the bladder member 14, the diaphragm 17 and the valve stem 20 are returned to their original positions by the first and second elastic members 22 and 23. Due to this fact, as high pressure fluid accommodated in the inlet-side space A flows through a pilot hole 26 defined in the diaphragm 17 into the valve chamber C defined between the cap 3 and the diaphragm 17, when fluid pressure balance is effected between the inlet-side space A and the valve chamber C, the diaphragm 17 closes the guide conduit 10.

The power transmission means includes a power transmission shaft 27, a connecting rod 28, a sleeve 29 and a third elastic member 30. The power transmission shaft 27 is joined to the valve stem 20. The connecting rod 28 is positioned between the power transmission shaft 27 and the bladder member 14 of the button 5 to transmit power. The sleeve 29 receives therein the connecting rod 28 to guide reciprocation of the connecting rod 28. The third elastic member 30 applies returning force to the connecting rod 28 when the diaphragm 17 closes the guide conduit 10.

The power transmission shaft 27 is joined at an upper end thereof to a lower end of the valve stem 20. The power transmission shaft 27 is moved upward when the bladder member 14 is expanded, to allow the valve stem 20 to open the orifice 19 of the valve seat 18 and the diaphragm 17 to open the guide conduit 10.

The connecting rod 28 has an upper end which is connected to a lower end of the power transmission shaft 27 and a lower end which is formed as a pressure plate 31 to be brought into contact with the bladder member 14 of the button 5. The connecting rod 28 is moved upward by the expansion of the bladder member 14 to move upward the power transmission shaft 27.

The sleeve 29 is located between the guide conduit 10 and the holder 4 and defined with a center opening 32 in which the connecting rod 28 is reciprocatingly disposed.

The third elastic member 30 is interposed between the pressure plate 31 of the connecting rod 28 and the sleeve 29. The third elastic member 30 functions to apply elastic force for returning the connecting rod 28 to its original position when the bladder member 14 returns to its original state.

Hereafter, a procedure for controlling fluid flow using the diaphragm valve according to the first embodiment of the present invention, constructed as mentioned above, will be described with reference to FIGS. 3 and 4.

Figure 3:
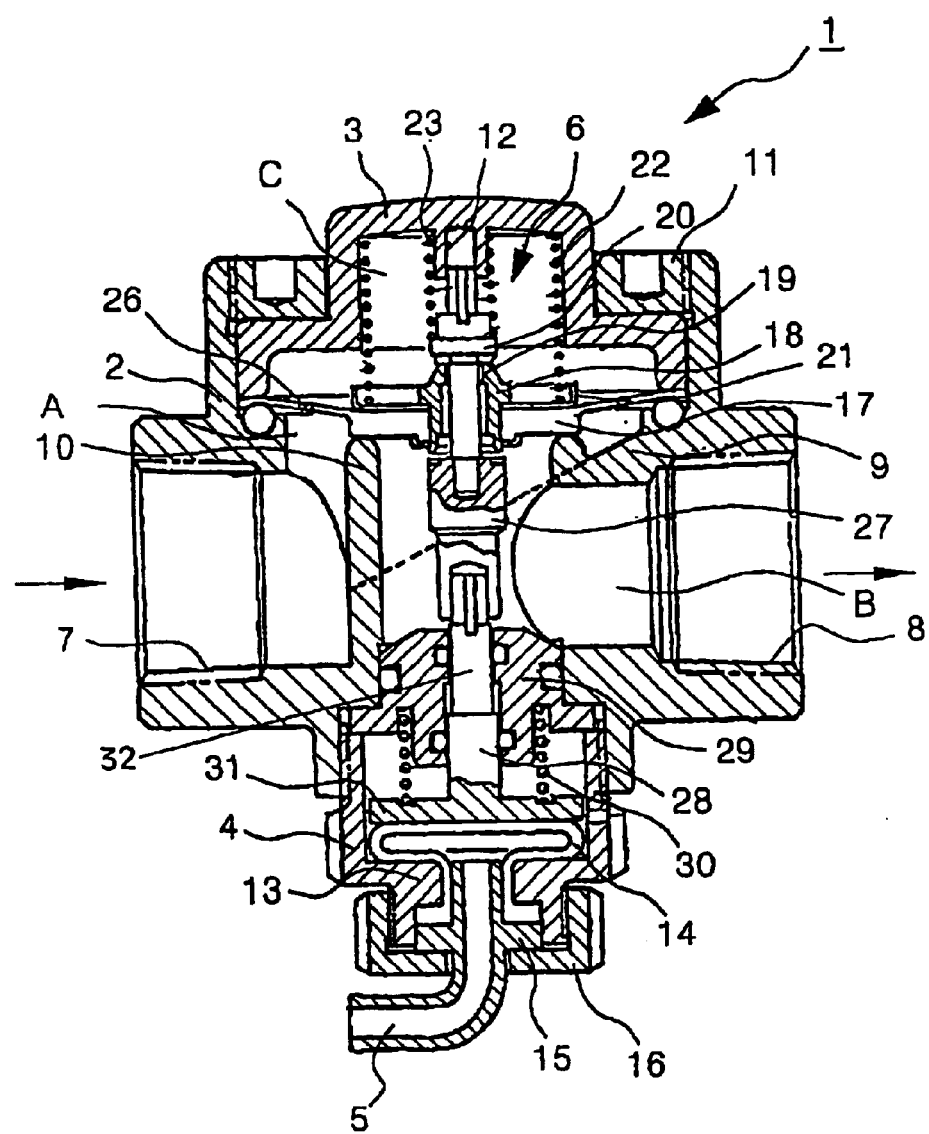
FIG. 3 is a side cross-sectional view of the diaphragm valve shown in FIG. 1, illustrating a state wherein a flow path is closed.
Figure 4:
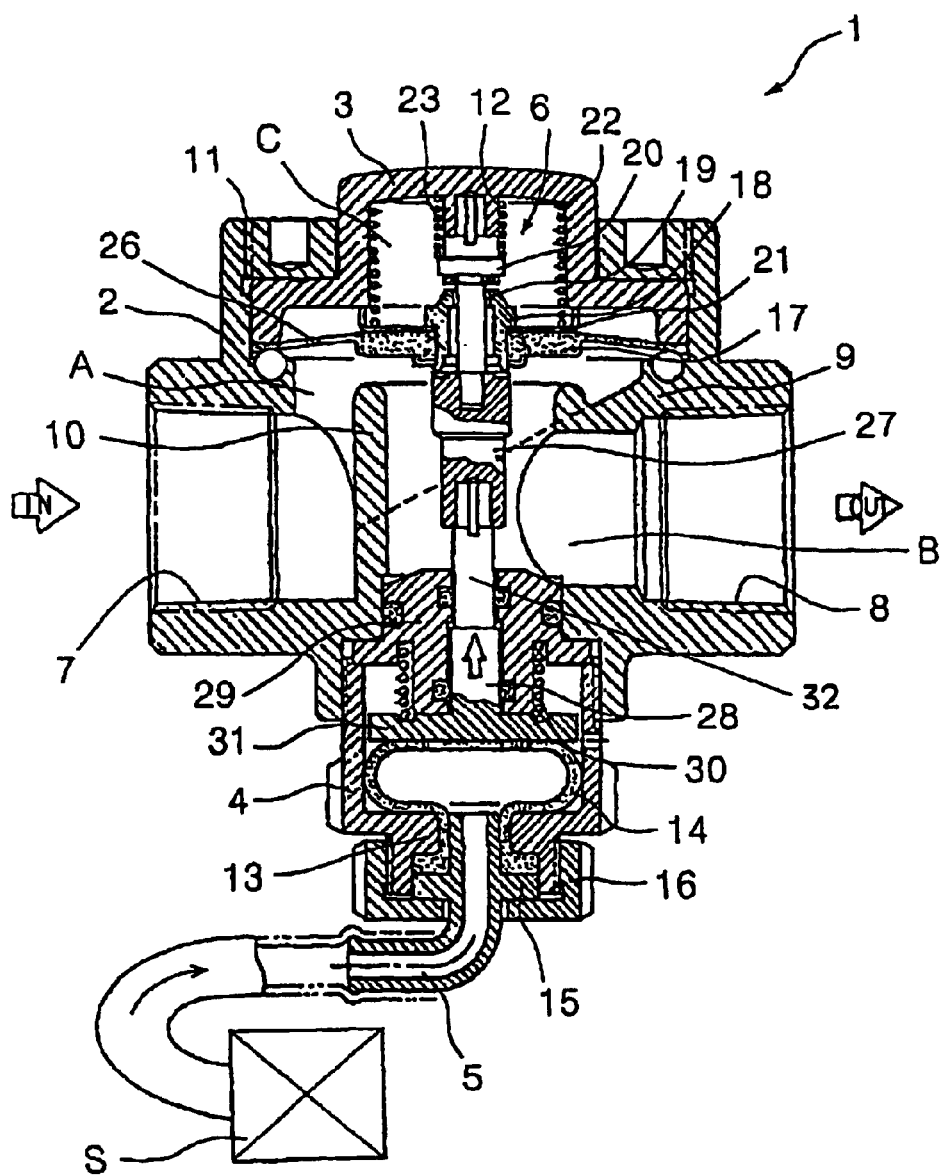
FIG. 4 is a side cross-sectional view of the diaphragm valve shown in FIG. 1, illustrating a state wherein the flow path is opened.

FIG. 3 illustrates a state before the bladder member 14 of the button 5, which is received in the holder 4, is expanded. In this state, as working fluid is supplied from the working fluid supplier S into the button 5, if the bladder member 14 is expanded, the connecting rod 28 moves upward the power transmission shaft 27. By the upward movement of the power transmission shaft 27, as the valve stem 20 closing the orifice 19 of the valve seat 18 is also moved upward, the orifice 19 is opened. At this time, since the first and second elastic members 22 and 23 are compressed, they accumulate elasticity. If the orifice 19 of the valve seat 18 is opened as described above, high pressure fluid accommodated in the valve chamber C between the cap 3 and the diaphragm 17 is discharged through the orifice 19 of the valve seat 18 into the outlet-side space B having a low pressure. By this fact, the valve chamber C finally has a low pressure. At this time, although high pressure fluid accommodated in the inlet-side space A flows into the valve chamber C between the cap 3 and the diaphragm 17 through the pilot hole 26 of the diaphragm 17, since an amount of fluid discharged through the orifice 19 into the outlet-side space B is greater than the inflow into the valve chamber C, the valve chamber C is converted into a lower pressure state, and thereby the diaphragm 17 opens the guide conduit 10.

Accordingly, fluid introduced into the valve housing 2 through the fluid inlet 7 flows through the opened guide conduit 10 to be discharged through the fluid outlet 8, and a user can use the discharged fluid.

Thereafter, if the working fluid supplied into the bladder member 14 of the button 5 is evacuated to interrupt fluid flow, as the bladder member 14 returns to its original state, the diaphragm 17 is moved toward the guide conduit 10 by returning force of the first and second elastic members 22 and 23. Then, as the valve stem 20 closes the orifice 19 of the valve seat 18, the high pressure fluid accommodated in the inlet-side space A flows into the valve chamber C defined between the cap 3 and the diaphragm 17 through the pilot hole 26 of the diaphragm 17. Thereafter, when fluid pressure balance is effected between the inlet-side space A and the valve chamber C, the diaphragm 17 closes the guide conduit 10 and interrupts fluid flow from the inlet-side space A into the outlet-side space B.

In this first embodiment of the present invention, since the button 5 can be hydraulically and pneumatically manipulated in a remote manner, the diaphragm valve 1 can be used in lieu of a solenoid valve. In particular, at a place where electricity is not supplied, fluid flow can be controlled by manually pressing the button 5.

Figure 5:
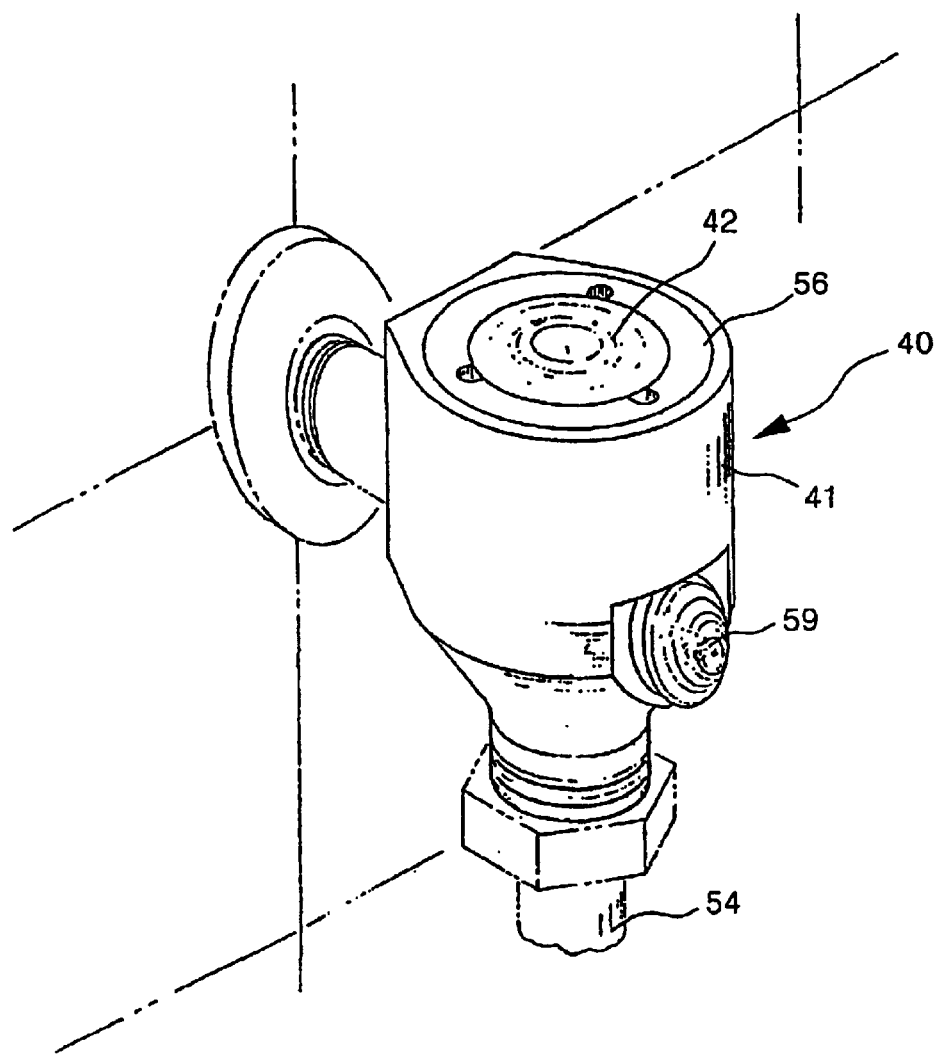
FIG. 5 is a perspective view illustrating a hydraulically and pneumatically operated diaphragm valve in accordance with a second embodiment of the present invention.
Figure 6:
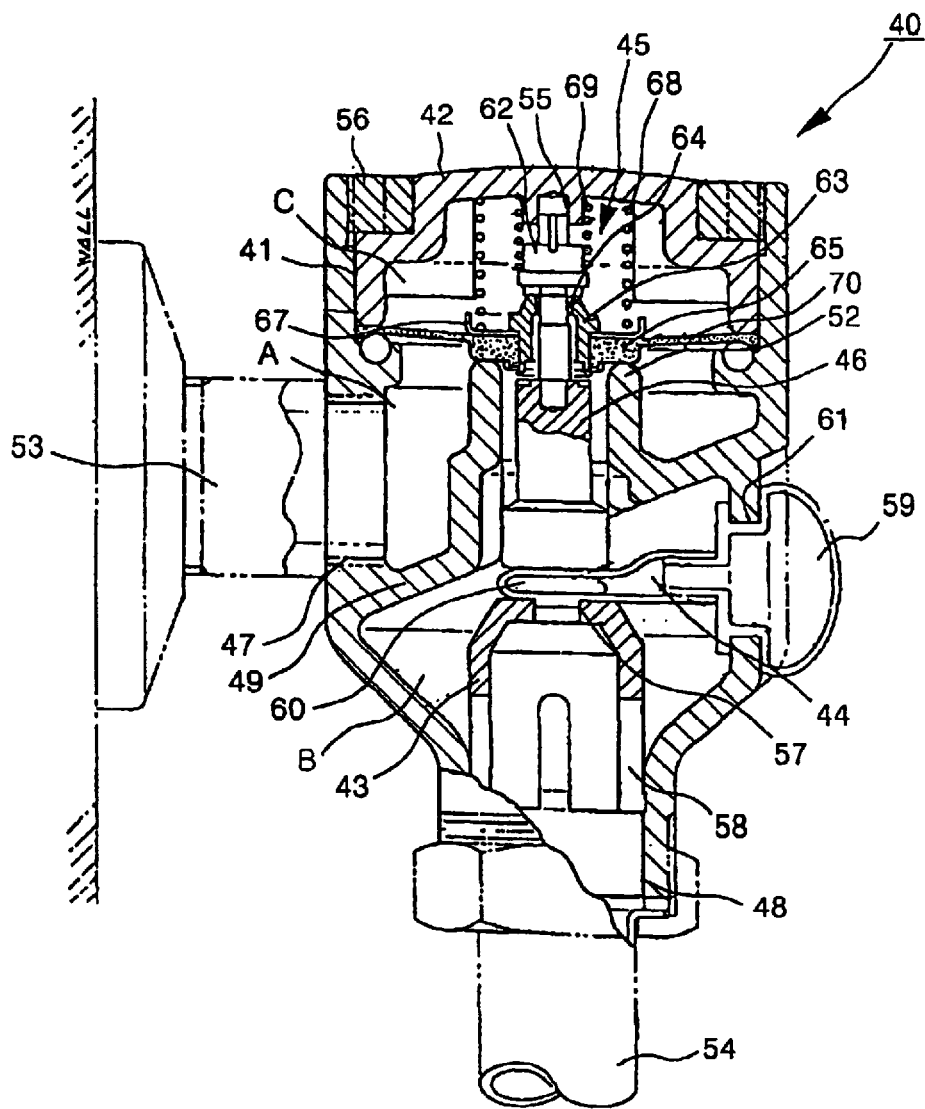
FIG. 6 is a side cross-sectional view of the diaphragm valve shown in FIG. 5, illustrating a state wherein a flow path is closed.
Figure 7:
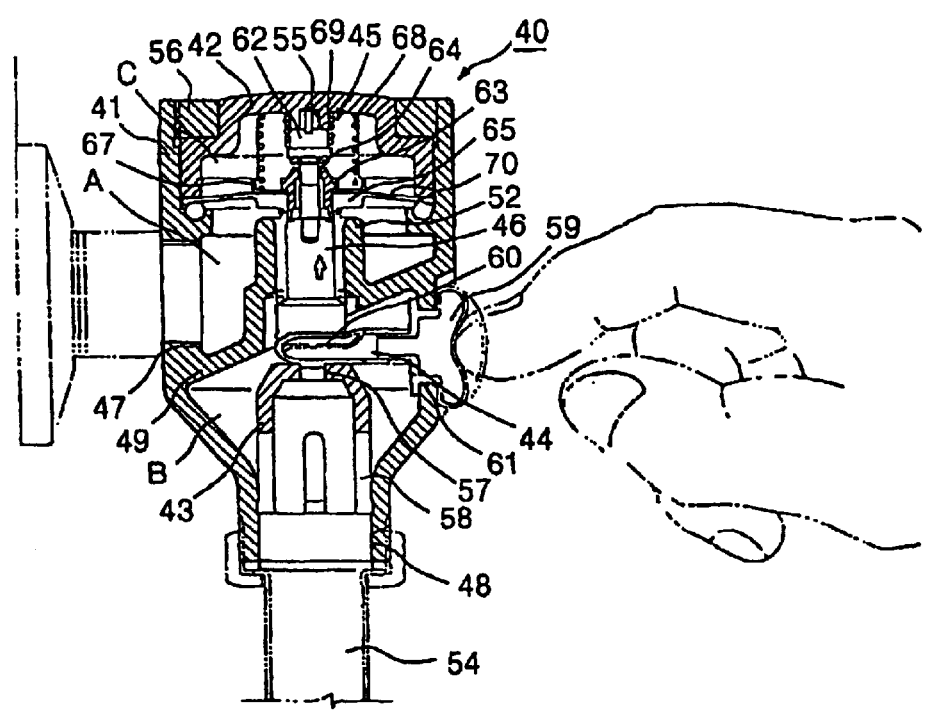
FIG. 7 is a side cross-sectional view of the diaphragm valve shown in FIG. 5, illustrating a state wherein the flow path is opened.

Referring to FIGS. 5 through 7, there is shown a hydraulically and pneumatically operated diaphragm valve in accordance with a second embodiment of the present invention. The hydraulically and pneumatically operated diaphragm valve designated by reference numeral 40 comprises a valve housing 41, a cap 42, a flow connector 43, a button 44, fluid controlling means 45, and a power transmission shaft 46. The valve housing 41 is defined therein with a fluid path. The cap 42 closes an upper end opening of the valve housing 41. The flow connector 43 is fixedly located at a fluid outlet 48 of the valve housing 41 in a concentric relationship with a guide conduit 52 of the valve housing 41. The button 44 is filled with working fluid. An inner end of the button 44 is fixed with respect to the flow connector 43, and an outer end of the button 44 is projectedly installed through a right side wall of the valve housing 41. Upon being manipulated by a user, the inner end of the button 44 can be expanded and return to its original state to open and close the flow path. The fluid controlling means 45 has a diaphragm 65. The diaphragm 65 opens the flow path when the outer end of the button 44 is pressed and closes the flow path when the outer end of the button 44 is released. The power transmission shaft 46 is disposed between the inner end of the button 44 and the fluid controlling means 45. When the inner end of the button 44 is expanded, the power transmission shaft 46 is moved upward and transmits power so as to allow the diaphragm 65 to open the flow path.

The valve housing 41 is defined at one side wall thereof with a fluid inlet 47 and at a lengthwise lower wall thereof with the fluid outlet 48. The valve housing 41 possesses the upper end opening which is defined in opposition to the fluid outlet 48 and is communicated with the inside of the valve housing 41. The upper end opening of the valve housing 41 is closed by the cap 42. The valve housing 41 has formed therein an upright wall 49 which divides a space in the valve housing 41 into an inlet-side space A and an outlet-side space B. The valve housing 41 is projectedly formed at a center portion thereof with the guide conduit 52 through which fluid introduced into the valve housing 41 through the fluid inlet 47 can flow to be discharged through the fluid outlet 48.

Both side walls of the valve housing 41 which define the fluid inlet 47 and outlet 48 are formed with internal threads, in a manner such that a fluid supply pipe 53 and a discharge guide member 54 can be threadedly coupled into the internal threads.

The guide conduit 52 projects at the lengthwise center portion of the valve housing 41 toward the cap 42. The guide conduit 52 is opened and closed by the fluid controlling means 45 which is installed in the upper end opening of the valve housing 41.

The cap 42 is detachably assembled to an upper wall of the valve housing 41. After the fluid controlling means 45 is installed in the upper end opening of the valve housing 41, the cap 42 closes the upper end opening. The cap 42 has a receptacle-shaped contour. A receiving groove 55 for receiving an upper end of a valve stem 62 constituting the fluid controlling means 45 is defined at a center portion of the cap 42. The cap 42 is locked to the valve housing 41 by means of a lock nut 56.

The flow connector 43 has a container-shaped configuration and is defined, on an upper wall thereof, with a center hole 57. The flow connector 43 is further defined, on a side wall thereof and adjacent to an opened lower end thereof, with at least one fluid passage 58 through which fluid passing through the guide conduit 52 can flow toward the fluid outlet 48. The flow connector 43 is installed on the lower wall of the housing 41, defining the fluid outlet 48, in a manner such that the center hole 57 is aligned concentrically with the guide conduit 52.

Here, it is preferred that a plurality of fluid passages 58 are defined through the side wall of the flow connector 43 so that they are spaced apart one from another in a circumferential direction.

The button 44 has a pipe member and first and second bladder members 59 and 60 which are connected to both ends of the pipe member. The button 44 is filled with working fluid. The first bladder member 59 projects to the outside through an assembling hole 61 defined in the other side wall of the valve housing 41. The second bladder member 60 is fixed in the center hole 57 of the flow connector 43, in a manner such that, when the fist bladder member 59 is pressed and released, the second bladder member 60 is expanded and returns to its original state, respectively, so as to allow the diaphragm 65 to open and close the guide conduit 52.

Here, it is preferred that the first and second bladder members 59 and 60 are made of a soft material such as rubber.

The fluid controlling means 45 is well known in the art as in the case of the fluid controlling means 6 of the first embodiment. The fluid controlling means 45 is arranged between the cap 42 and the guide conduit 52. The fluid controlling means 45 is configured in a manner such that, when the valve stem 62 is moved upward by pressing of the first bladder member 59 of the button 44 and an orifice 64 defined through a valve seat 63 is opened, fluid accommodated in a valve chamber C defined between the cap 42 and the diaphragm 65 is discharged through the orifice 64 into the outlet-side space B. Thereafter, as the valve chamber C is converted into a low pressure state, the diaphragm 65 opens the guide conduit 52 under action of a high pressure in the inlet-side space A. If the first bladder member 59 of the button 44 is released, the diaphragm 65 and the valve stem 62 are returned to their original positions by first and second elastic members 68 and 69 respectively interposed between the cap 42 and a support plate 67 and between the cap 52 and the valve stem 62. By this fact, as high pressure fluid accommodated in the inlet-side space A flows through a pilot hole 70 defined in the diaphragm 65 into the valve chamber C, when fluid pressure balance is effected between the inlet-side space A and the valve chamber C, the diaphragm 65 closes the guide conduit 52.

The power transmission shaft 46 is disposed in the guide conduit 52. The power transmission shaft 46 has an upper end which is joined to a lower end of the valve stem 62. The power transmission shaft 46 is moved upward by the second bladder member 60 of the button 44 which is expanded when the first bladder member 59 is pressed, and returns to its original position when the fist bladder member 59 is released, so as to allow the diaphragm 65 to open and close the guide conduit 52.

Hereafter, a procedure for controlling fluid flow using the diaphragm valve according to the second embodiment of the present invention, constructed as mentioned above, will be described with reference to FIGS. 6 and 7.

FIG. 6 illustrates a state before the first bladder member 59 of the button 44, which projects out of the other side wall of the valve housing 41, is pressed. In this state, if the first bladder member 59 is pressed by the user, as working fluid flows into the second bladder member 60, the second bladder member 60 is expanded. By the expansion of the second bladder member 60, the power transmission shaft 46 is moved upward, and, as the valve stem 62 closing the orifice 64 of the valve seat 63 is also moved upward, the orifice 64 is opened. At this time, since the first and second elastic members 68 and 69 are compressed, they accumulate elasticity.

If the orifice 64 of the valve seat 63 is opened as described above, high pressure fluid accommodated in the valve chamber C between the cap 42 and the diaphragm 65 is discharged through the orifice 64 of the valve seat 63 into the outlet-side space B having a low pressure. At this time, although high pressure fluid accommodated in the inlet-side space A flows into the valve chamber C between the cap 42 and the diaphragm 65 through the pilot hole 70 of the diaphragm 65, since an amount of fluid discharged through the orifice 64 into the outlet-side space B is greater than the inflow into the valve chamber C, fluid existing in the valve chamber C has a low pressure, and the diaphragm 65 opens the guide conduit 52 under the action of a high pressure governing the inlet-side space A. Accordingly, fluid introduced into the valve housing 41 through the fluid inlet 47 flows through the opened guide conduit 52 to be discharged through the fluid outlet 48, and the user can use the discharged fluid.

When the use of fluid is completed with the first bladder member 59 of the button 44 pressed, if the first bladder member 59 is released, the diaphragm 65 is moved toward the guide conduit 52 by returning force of the first and second elastic members 68 and 69. Then, as the valve stem 62 closes the orifice 64 of the valve seat 63, the high pressure fluid accommodated in the inlet-side space A flows into the valve chamber C through the pilot hole 70. Thereafter, when fluid pressure balance is effected between the inlet-side space A and the valve chamber C, the diaphragm 65 closes the guide conduit 52 and interrupts fluid flow from the inlet-side space A into the outlet-side space B.

The diaphragm valve 40 according to this second embodiment of the present invention provides advantages in that, since it can be installed on a urinal, it is possible to wash the urinal using water discharged by softly pressing the projected button, whereby even children or old and feeble persons can conveniently manipulate the diaphragm valve 40.

Figure 8:
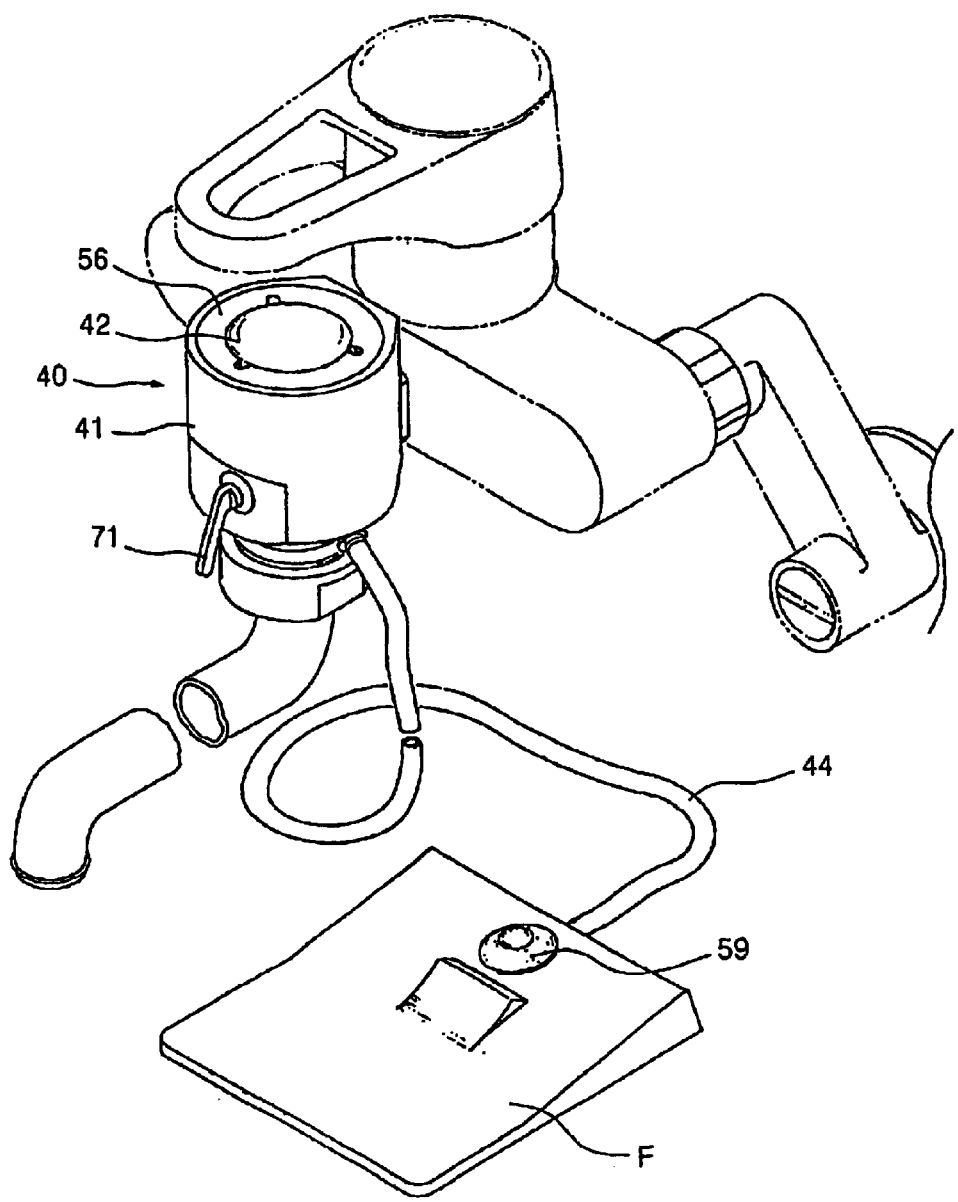
FIG. 8 is a perspective view illustrating a hydraulically and pneumatically operated diaphragm valve in accordance with a third embodiment of the present invention.
Figure 9:
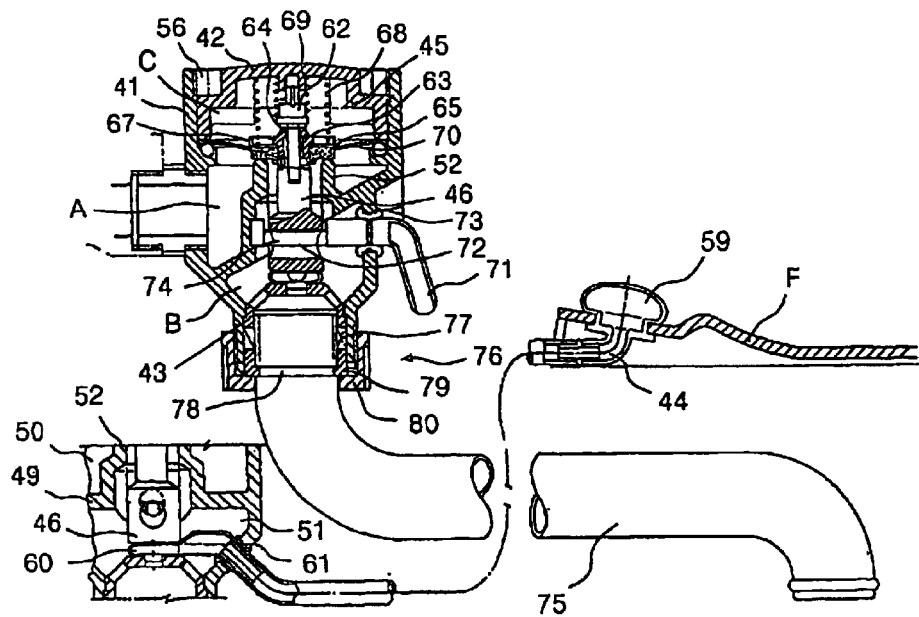
FIG. 9 shows a side cross-sectional view and a partial front cross-sectional view of the diaphragm valve shown in FIG. 8, illustrating a state wherein a flow path is closed.
Figure 10:
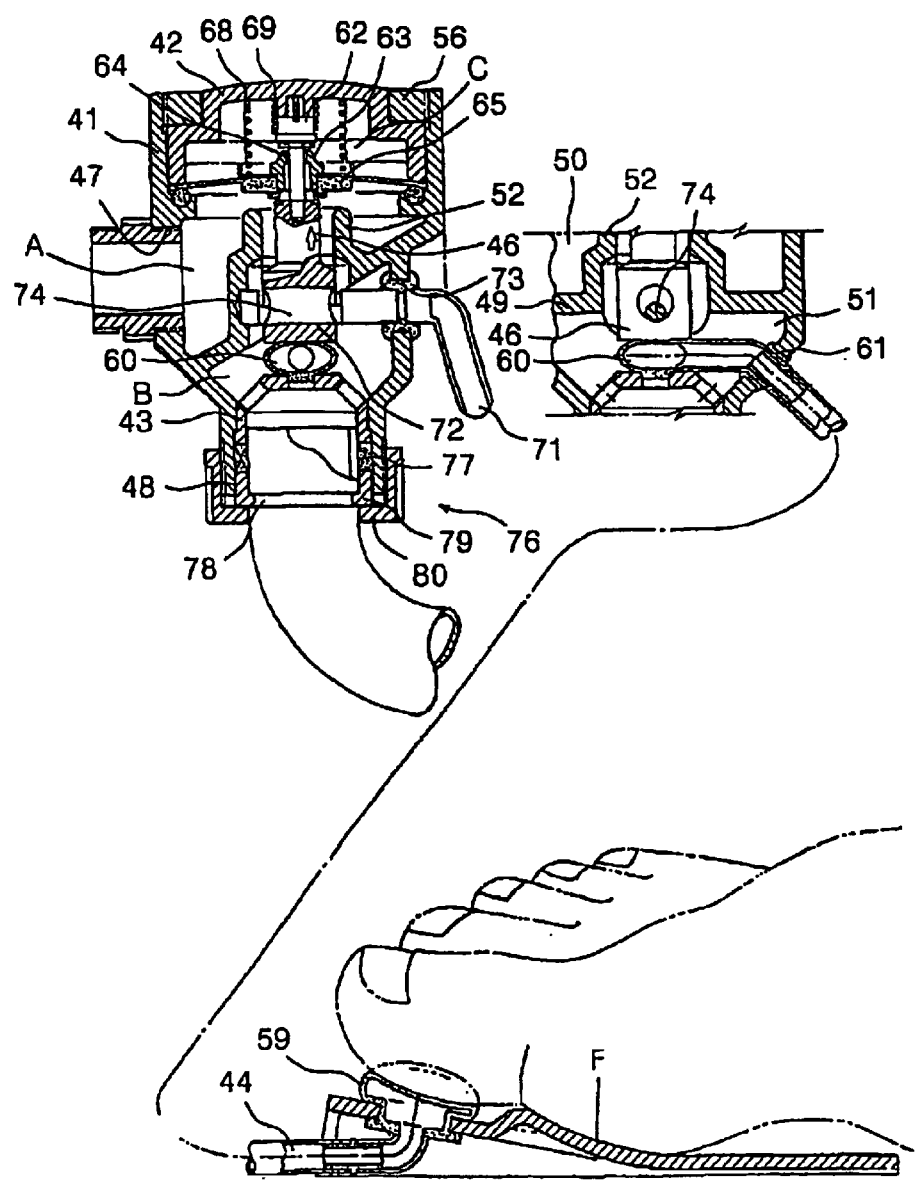
FIG. 10 shows a side cross-sectional view and a partial front cross-sectional view of the diaphragm valve shown in FIG. 8, illustrating a state wherein the flow path is opened.

Referring to FIGS. 8 through 10, there is shown a hydraulically and pneumatically operated diaphragm valve in accordance with a third embodiment of the present invention. In the hydraulically and pneumatically operated diaphragm valve designated by reference numeral 40, the first bladder member 59 of the button 44 is drawn out through the assembling hole 61 which is defined through the other side wall of the valve housing 41, and is projectedly installed on a separate support body.

Here, as can be readily seen from FIGS. 9 and 10, the first bladder member 59 of the button 44 is attached to a foot plate F in a manner such that it can be pressed by the foot of the user to control fluid flow. Since the fluid flow controlling procedure is implemented in the same manner as the second embodiment of the present invention, detailed description thereof will omitted herein.

In the diaphragm valve 40 according to this third embodiment of the present invention, a lever 71 is additionally installed through the other side wall of the valve housing 41. If the lever 71 is manipulated, the diaphragm 65 can open the guide conduit 52.

Therefore, the lever 71 can continuously open and close the guide conduit 52 by being rotatively manipulated by the user.

A shaft hole 72 is defined through the power transmission shaft 46 in a diametrical direction. The lever 71 is rotatively installed through the other side wall of the valve housing 41, and an eccentric shaft 74 is integrally formed at a distal end of the manipulation lever 71 and inserted into the shaft hole 46. Thus, when the lever 71 is rotated by the user, the eccentric shaft 74 inserted into the shaft hole 46 moves upward the power transmission shaft 46 to allow the diaphragm 65 and the valve stem 62 to open the guide conduit 52 and the orifice 64 of the valve seat 63, respectively. Consequently, fluid can be continuously supplied into the guide conduit 52, independently of the manipulation of the button 44.

Further, in this third embodiment of the present invention, a discharge guide member 75 is rotatably connected to the lower wall of the valve housing 41, defining the fluid outlet 48, by clamping means 76, to guide fluid discharged through the fluid outlet 48 to a desired place.

The clamping means 76 for connecting the discharge guide member 75 to the lower wall of the valve housing 41 comprises a packing 77, a packing gland 79 and a tightening nut 80. The packing 77 is placed on the lower end of the flow connector 43. The packing gland 79 is fitted into the fluid outlet 48 of the valve housing 41 to squeeze the packing 77 against the lower end of the flow connector 43. The packing gland 79 is formed on a circumferential inner surface thereof with a projection which is to be engaged into a groove 78 defined on a circumferential outer surface of the discharge guide member 75. The tightening nut 80 is threadedly coupled around a lower end of the valve housing 41 to press the packing gland 79 inward.

The diaphragm valve 40 according to this third embodiment of the present invention provides advantages in that, since it can be installed on a kitchen sink or in a toilet to allow water to be used by simply pressing the button 44, waste of water can be prevented. Moreover, by installing the button 44 at a place where it can be conveniently manipulated by the human body portion, for example, the foot or the knee, even a handicapped person can conveniently operate the diaphragm valve 40.

Figure 11:
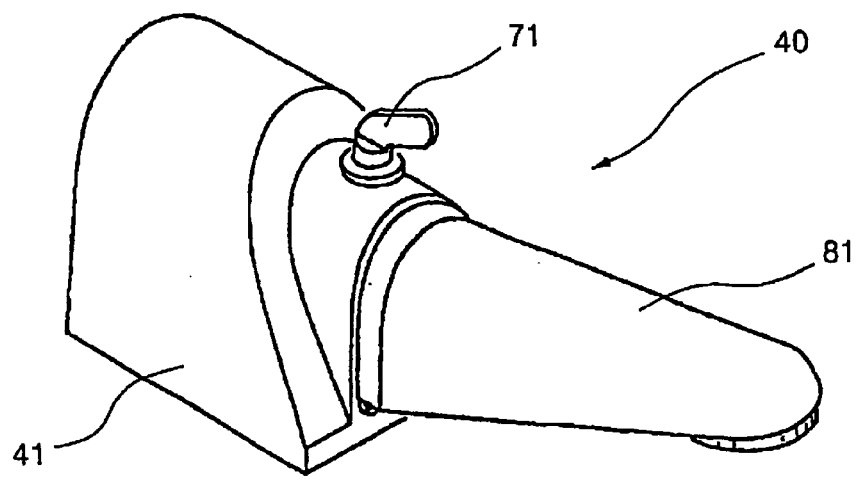
FIG. 11 is a perspective view illustrating a hydraulically and pneumatically operated diaphragm valve in accordance with a fourth embodiment of the present invention.
Figure 12:
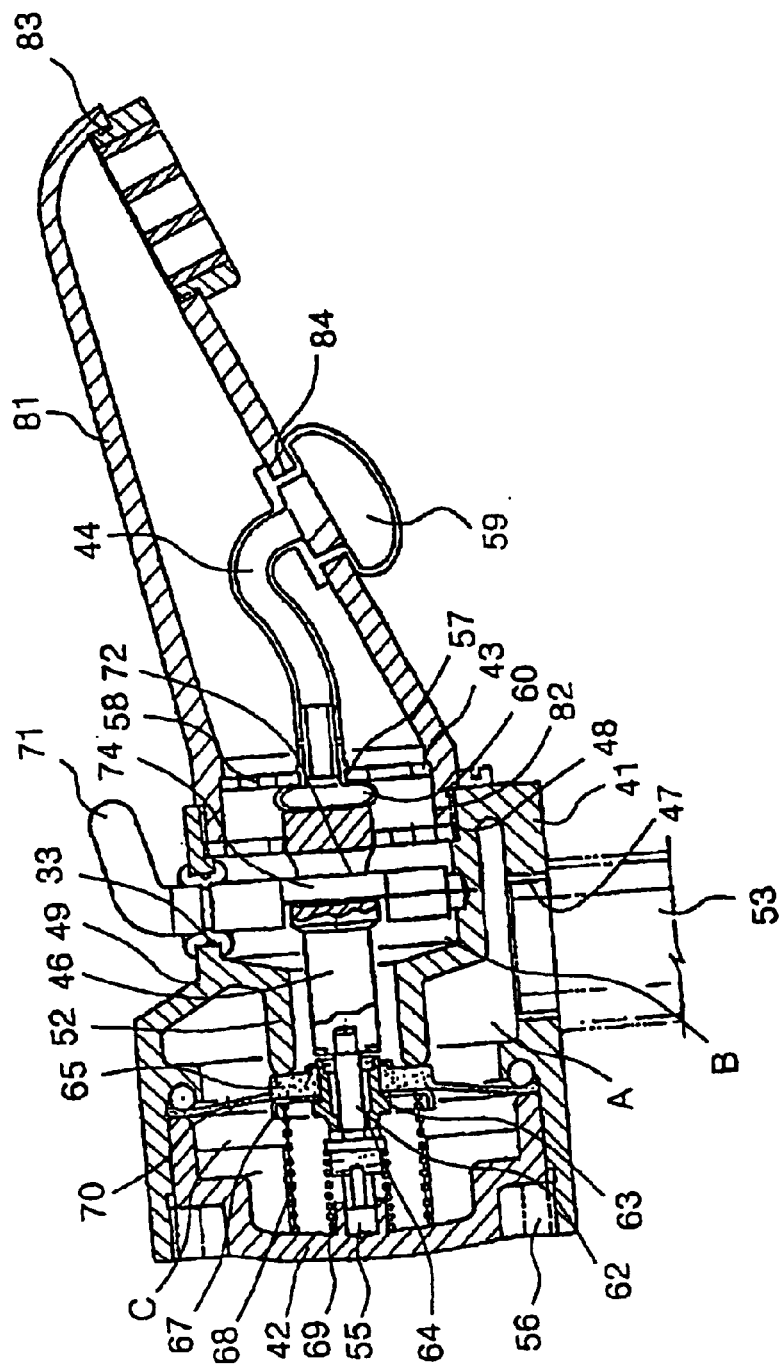
FIG. 12 is a side cross-sectional view of the diaphragm valve shown in FIG. 11, illustrating a state wherein a flow path is closed.
Figure 13:
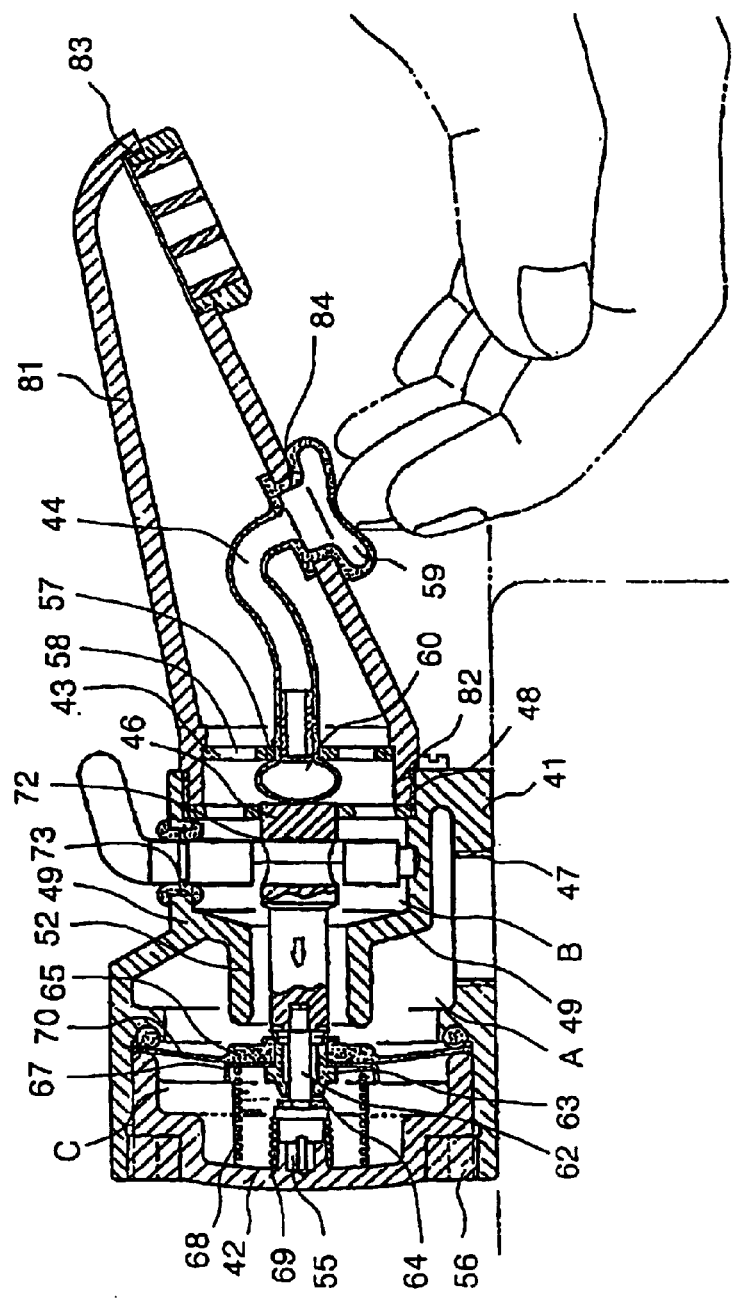
FIG. 13 is a side cross-sectional view of the diaphragm valve shown in FIG. 11, illustrating a state wherein the flow path is opened.
Figure 14:
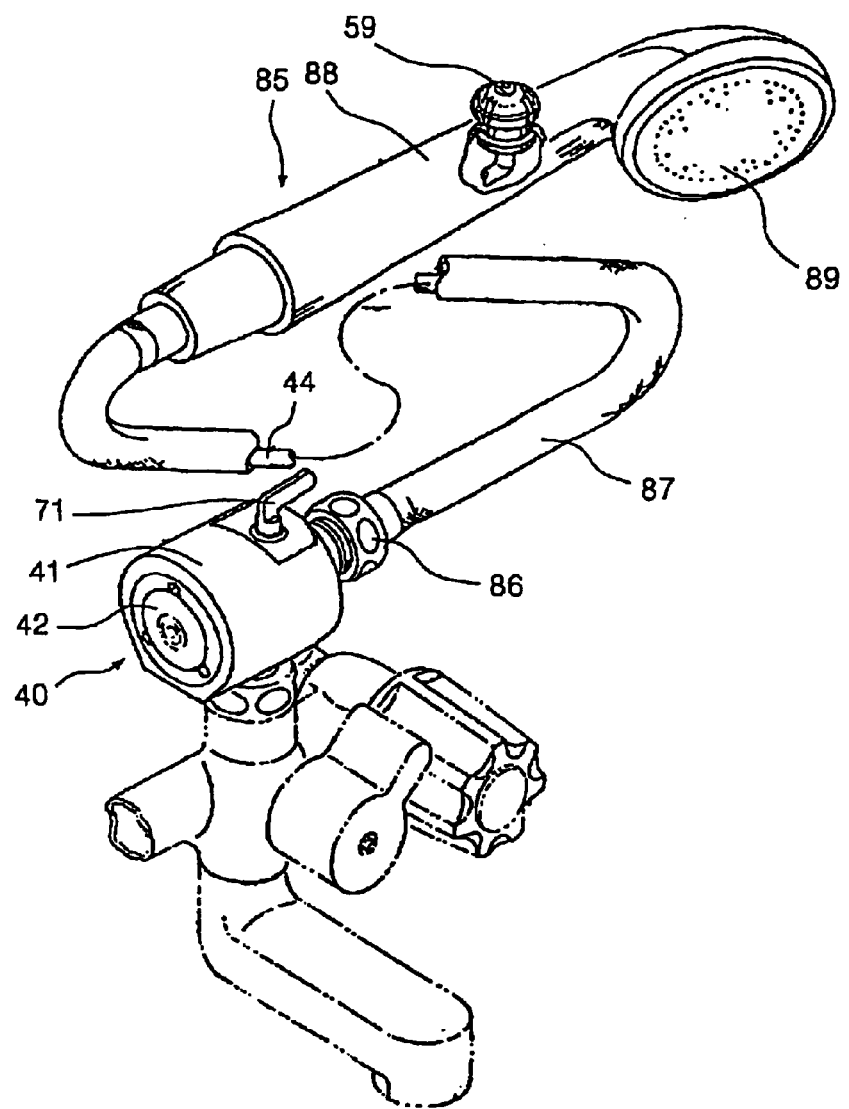
FIG. 14 is a perspective view illustrating a hydraulically and pneumatically operated diaphragm valve in accordance with a fifth embodiment of the present invention.
Figure 15:
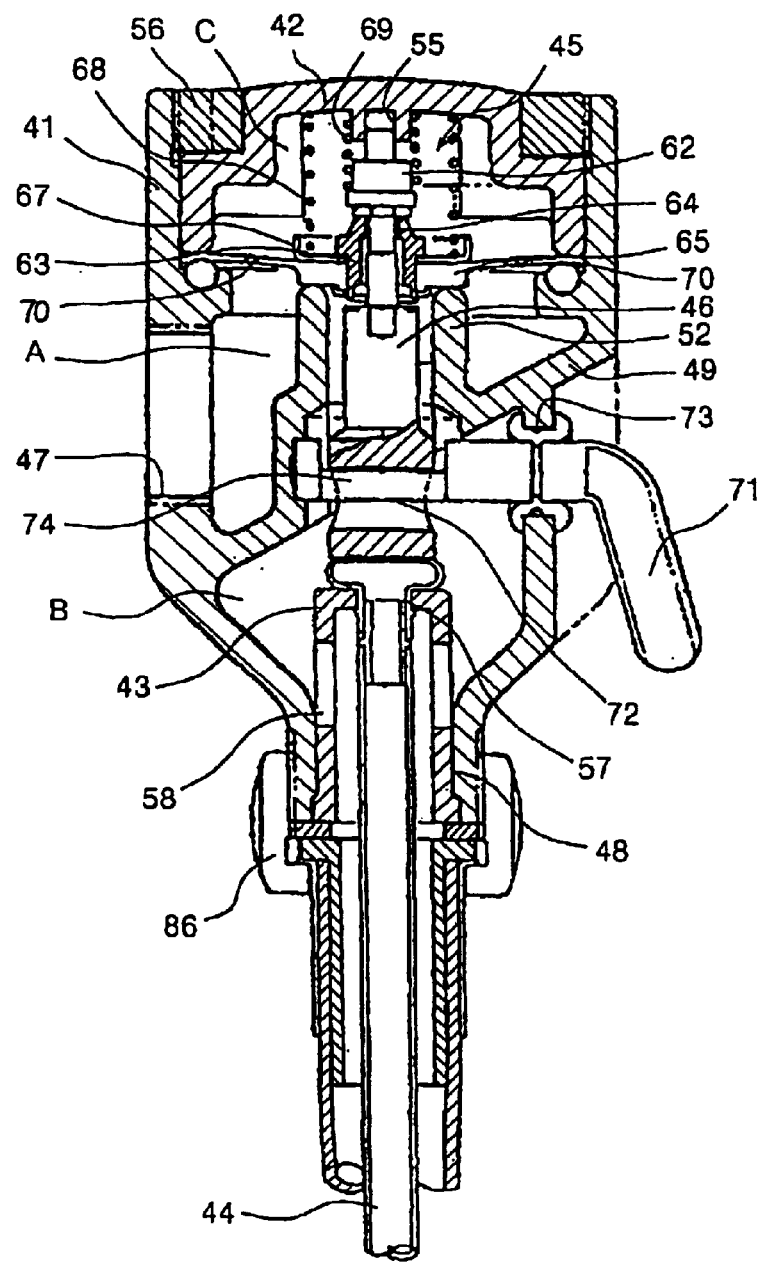
FIG. 15 is a side cross-sectional view of the diaphragm valve shown in FIG. 14, illustrating a state wherein a flow path is closed.
Figure 16:
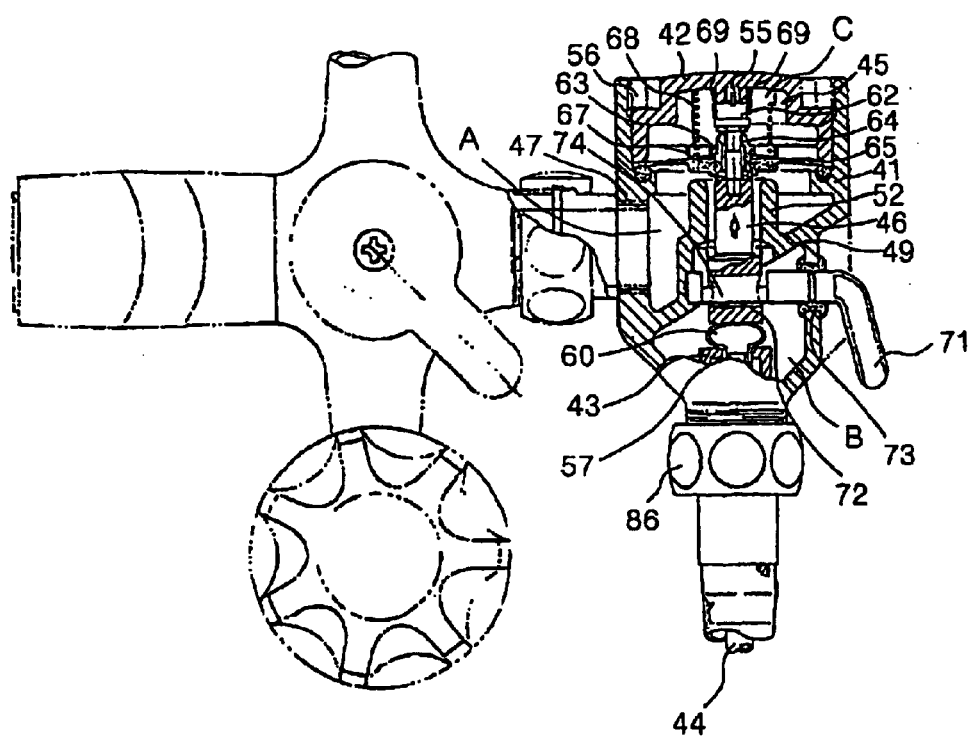
FIG. 16 is a side cross-sectional view of the diaphragm valve shown in FIG. 14, illustrating a state wherein the flow path is opened.
Figure 17:
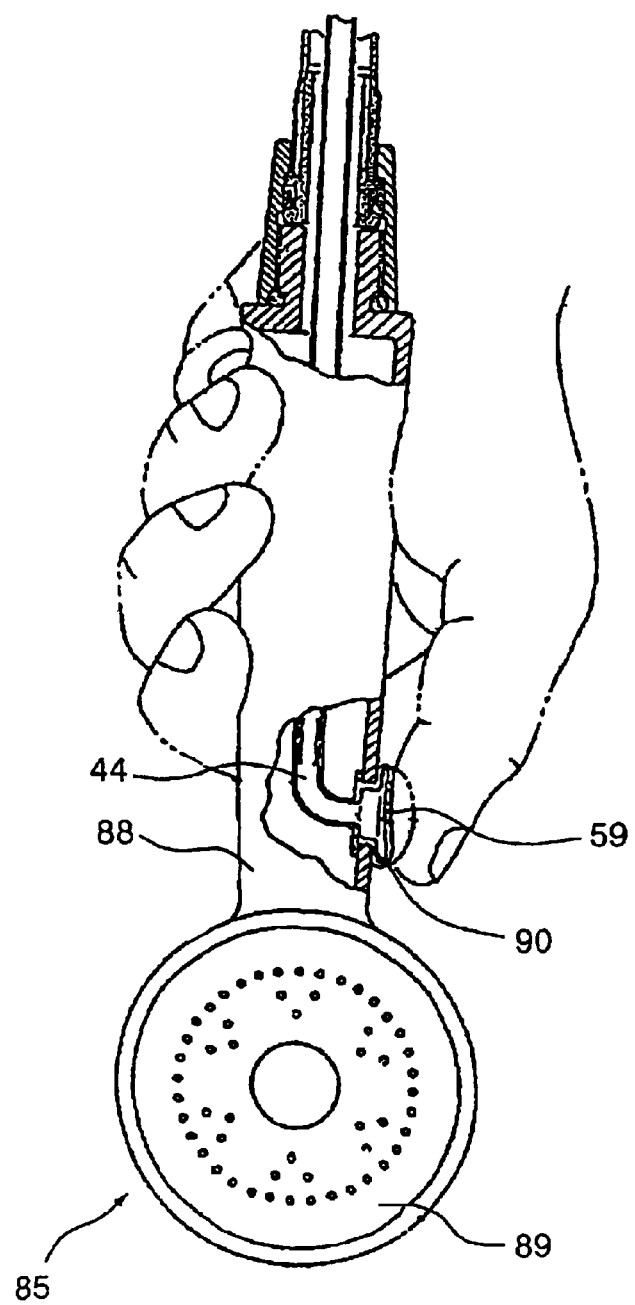
FIG. 17 is a front view of the diaphragm valve shown in FIG. 14, illustrating a state wherein a button is attached to a shower unit.

Referring to FIGS. 11 through 13, there is shown a hydraulically and pneumatically operated diaphragm valve in accordance with a fourth embodiment of the present invention. In the hydraulically and pneumatically operated diaphragm valve designated by reference numeral 40, a discharge guide member 81 is installed in the fluid outlet 48 of the valve housing 41. The button 44 is fixed to the discharge guide member 81 to allow use of fluid with the button 44 pressed and to thereby prevent waste of fluid.

The discharge guide member 81 is communicated with the fluid outlet 48 of the valve housing 41 to guide discharged fluid to a desired place. The discharge guide member 81 can be employed in a washstand of a bathroom or a sink of a kitchen. The discharge guide member 81 is defined with an entrance 82 which is communicated with the fluid outlet 48 of the valve housing 41 and an exit 83 which is opened downward. Adjacent to the exit 83, an assembling hole 84, through which the first bladder member 59 of the button 44 is installed, is defined in the discharge guide member 81. Here, it is preferred that the assembling hole 84 is defined adjacent to the exit 83 through a lower wall of the discharge guide member 81 in consideration of convenience upon pressing the first bladder member 59.

As a consequence, by pressing the first bladder member 59 which projects out of the lower wall of the discharge guide member 81, the user can use fluid which is discharged through the exit 83 of the discharge guide member 81 under the control of the fluid controlling means 45. Then, at the same time that the first bladder member 59 is released, fluid discharge is interrupted, whereby waste of water is prevented.

In other words, if the first bladder member 59 is pressed by the user, as the diaphragm 65 opens the guide conduit 52, fluid is discharged through the exit 83. Then, if the first bladder member 59 is released, as the diaphragm 65 closes the guide conduit 52, fluid discharge is interrupted. Since the diaphragm 65 is operated in the same manner as the second embodiment of the present invention, further detailed description thereof will be omitted.

The diaphragm valve 40 according to this fourth embodiment of the present invention provides advantages in that, since it can be installed on a washstand to allow water to be discharged only when the button 44 is pressed, waste of water is prevented. Also, because the first bladder member 59 of the button 44 is installed on the lower wall of the discharge guide member 81, it is possible to wash the hand while pressing the button 44, whereby user convenience is rendered.

Referring to FIGS. 14 through 17, there is shown a hydraulically and pneumatically operated diaphragm valve in accordance with a fifth embodiment of the present invention. In the hydraulically and pneumatically operated diaphragm valve designated by reference numeral 40, the discharge guide member 81 of the fourth embodiment is replaced with a shower unit 85.

The shower unit 85 is detachably coupled into the fluid outlet 48 of the valve housing 41 by means of a coupling nut 86.

As in the conventional art, the shower unit 85 comprises a hose 87 and a shower head 88 which is connected to a distal end of the hose 87.

In the shower unit 85, the hose 87 is connected at one end thereof to the fluid outlet 48 of the valve housing 41 to supply fluid to the shower head 88 having a handle. The shower head 88 has a nozzle plate 89 defined with a plurality of nozzle holes through which fluid is injected. The handle of the shower head 88 is defined with an assembling hole 90. The first bladder member 59 of the button 44 is projectedly installed through the assembling hole 90. Thus, it is possible to conveniently manipulate the first bladder member 59 while taking a shower.

Upon using the shower unit 85 constructed as mentioned above, as shown in FIGS. 15 and 16, as the first bladder member 59 of the button 44, which is installed on the head 88 of the shower unit 85, is pressed by the user, the diaphragm 65 opens the guide conduit 52, and thereby fluid is discharged through the nozzle plate 89. If the first bladder member 59 of the button 44 is released, the diaphragm 65 closes the guide conduit 52, and thereby fluid discharge is interrupted. Since the diaphragm 65 is operated in the same manner as the second embodiment of the present invention, further detailed description thereof will be omitted.

The diaphragm valve 40 according to this fifth embodiment of the present invention provides advantages in that, since water is discharged only when the button 44 installed on the shower head 88 is pressed, waste of water is prevented upon taking a shower. Also, because the shower unit 85 can be closed by simply releasing the button 44 without requiring any additional manipulation, user convenience is rendered.

Industrial Applicability

As apparent from the above description, the hydraulically and pneumatically operated diaphragm valve according to the present invention provides advantages in that, since fluid is discharged only upon pressing a button and fluid flow is interrupted upon releasing the button, the diaphragm valve can be automatically or manually manipulated.

In particular, due to the fact that the diaphragm valve can be manually manipulated without using electricity, the diaphragm valve according to the present invention can be used in lieu of a solenoid valve at a place where electricity is not supplied. Also, it is possible to minimize waste of water.

The diaphragm valve according to the present invention can be installed on a kitchen sink, or in a bathroom or toilet to prevent waste of water.

What is claimed is:

1. A hydraulically and pneumatically operated diaphragm valve comprising:
   a valve housing defined at both side walls thereof with a fluid inlet and a fluid outlet, the valve housing possessing an upper end opening and a lower end opening which are communicated with the inside of the valve housing, the valve housing having formed therein an upright wall which divides a space in the valve housing into an inlet-side space and an outlet-side space, the valve housing being projectedly formed at a center portion thereof with a guide conduit through which fluid introduced into the valve housing through the fluid inlet can flow to be discharged through the fluid outlet;
   a cap detachably assembled to an upper wall of the valve housing to close the upper end opening of the valve housing;
   a holder detachably assembled to a lower wall of the valve housing in opposition to the cap to be communicated with the lower end opening of the valve housing, and formed, on an inner surface thereof and adjacent to a lower end thereof, with an inward flange;
   a button having a configuration of a pipe member in a manner such that a bladder member, which is fixedly received in the holder by being squeezed against the inward flange of the holder, is connected to one end of the pipe member, and the other end of the pipe member projects out of the holder to be externally supplied with working fluid and thereby allow the bladder member to be expanded;
   fluid controlling means arranged between the guide conduit and the cap, the fluid controlling means being configured in a manner such that, when a valve stem is moved upward by expansion of the bladder member and an orifice defined through a valve seat is opened, fluid accommodated in a valve chamber defined between the cap and a diaphragm is discharged through the orifice into the outlet-side space, that, as the valve chamber has a low pressure, the diaphragm opens the guide conduit under action of a high pressure in the inlet-side space and fluid in the inlet-side space flows through the guide conduit into the outlet-side space, that, when the bladder member returns to its original state by evacuation of the working fluid from the bladder member, the diaphragm and the valve stem are returned to their original positions by first and second elastic members respectively interposed between the cap and a support plate and between the cap and the valve stem, and that, as high pressure fluid accommodated in the inlet-side space flows through a pilot hole defined in the diaphragm into the valve chamber, when fluid pressure balance is effected between the inlet-side space and the valve chamber, the diaphragm closes the guide conduit and interrupts fluid flow from the inlet-side space into the outlet-side space; and
   power transmission means configured in a manner such that it is moved upward by expansion of the bladder member of the button and transmits expansion force of the bladder member to the valve stem so as to allow the valve stem to open the orifice of the valve seat, and it returns to its original position when the bladder member returns to its original state.

2. The diaphragm valve as set forth in claim 1, wherein the power transmission means comprises:
   a power transmission shaft joined at an upper end thereof to a lower end of the valve stem, for moving upward the valve stem closing the orifice of the valve seat, when the bladder member of the button is expanded, and thereby opening the orifice of the valve seat;
   a connecting rod having an upper end which is connected to a lower end of the power transmission shaft and a lower end which is formed as a pressure plate to be brought into contact with the bladder member of the button, the connecting rod being moved upward by the expansion of the bladder member to move upward the power transmission shaft;
   a sleeve located between the guide conduit and the holder and defined with a center opening in which the connecting rod is reciprocatingly disposed; and
   a third elastic member interposed between the pressure plate of the connecting rod and the sleeve, for applying elastic force to return the connecting rod to its original position when the bladder member returns to its original state.

3. A hydraulically and pneumatically operated diaphragm valve comprising:
   a valve housing defined at one side wall thereof with a fluid inlet and at a lower wall thereof with a fluid outlet, the valve housing possessing an upper end opening which is defined in opposition to the fluid outlet and communicated with the inside of the valve housing, the valve housing having formed therein an upright wall which divides a space in the valve housing into an inlet-side space and an outlet-side space, the valve housing being projectedly formed at a center portion thereof with a guide conduit through which fluid introduced into the valve housing through the fluid inlet can flow to be discharged through the fluid outlet;
   a cap detachably assembled to an upper wall of the valve housing to close the upper end opening of the valve housing;
   a flow connector installed in the outlet-side opening of the valve housing concentrically with the guide conduit, the flow connector being defined, on an upper wall thereof, with a center hole and, on a side wall thereof and adjacent to an opened lower end thereof, with at least one fluid passage through which fluid passing through the guide conduit can flow toward the fluid outlet;
   a button having a pipe member and first and second bladder members which are connected to both ends of the pipe member, the button being filled with working fluid, the first bladder member projecting to the outside through an assembling hole defined in the other side wall of the valve housing and the second bladder member being fixed in the center hole of the flow connector, in a manner such that, when the fist bladder member is pressed and released, the second bladder member is expanded and returns to its original state, respectively;

fluid controlling means arranged between the guide conduit and the cap, the fluid controlling means being configured in a manner such that, when a valve stem is moved upward by pressing of the first bladder member and expansion of the second bladder member and an orifice defined through a valve seat is opened, high pressure fluid accommodated in a valve chamber defined between the cap and a diaphragm is discharged through the orifice into the outlet-side space having a low pressure, that, as the valve chamber has a low pressure, the diaphragm opens the guide conduit under action of a high pressure in the inlet-side space and fluid in the inlet-side space flows through the guide conduit into the outlet-side space, that, when the first bladder member is released and the second bladder member returns to its original state, the diaphragm and the valve stem are returned to their original positions by first and second elastic members respectively interposed between the cap and a support plate and between the cap and the valve stem, and that, as high pressure fluid accommodated in the inlet-side space flows through a pilot hole defined in the diaphragm into the valve chamber, when fluid pressure balance is effected between the inlet-side space and the valve chamber, the diaphragm closes the guide conduit and interrupts fluid flow from the inlet-side space into the outlet-side space; and a power transmission shaft disposed in the guide conduit and having an upper end which is joined to a lower end of the valve stem and a lower end which is brought into contact with the second bladder member, the power transmission shaft being configured in a manner such that it is moved upward by expansion of the second bladder member of the button and transmits expansion force of the second bladder member to the valve stem so as to allow the valve stem to open the orifice of the valve seat.

4. The diaphragm valve as set forth in claim 3, wherein a shaft hole is defined through the power transmission shaft in a diametrical direction; and a manipulation lever is rotatively installed through the other side wall of the valve housing, and an eccentric shaft is formed at a distal end of the lever and inserted into the shaft hole, in a manner such that, when the manipulation lever is rotated by a user, the eccentric shaft moves upward the power transmission shaft to allow the diaphragm to open the guide conduit.

5. The diaphragm valve as set forth in claim 3, wherein the first bladder member of the tube is projectedly installed on a separate support body.

6. The diaphragm valve as set forth in claim 3, wherein a discharge guide member which has an entrance and an exit is connected to the fluid outlet of the valve housing to guide fluid to a desired point; and the first bladder member of the button is projectedly installed through a wall of the discharge guide member, to allow use of fluid discharged through the exit of the discharge guide member while pressing the first bladder member.

7. The diaphragm valve as set forth in claim 6, wherein the discharge guide member comprises a shower unit; and the shower unit includes a hose detachably connected at one end thereof to the fluid outlet of the valve housing, and a shower head having a handle which is connected at one end thereof to the other end of the hose and defined with an assembling hole for installing the first bladder member and a nozzle plate which is connected to the other end of the handle and defined with a plurality of nozzle holes.

* * * * *